No. 896,742. PATENTED AUG. 25, 1908.
C. A. MEHAFFEY.
MARKER ATTACHMENT FOR CORN PLANTERS.
APPLICATION FILED SEPT. 4, 1907.
2 SHEETS—SHEET 1.
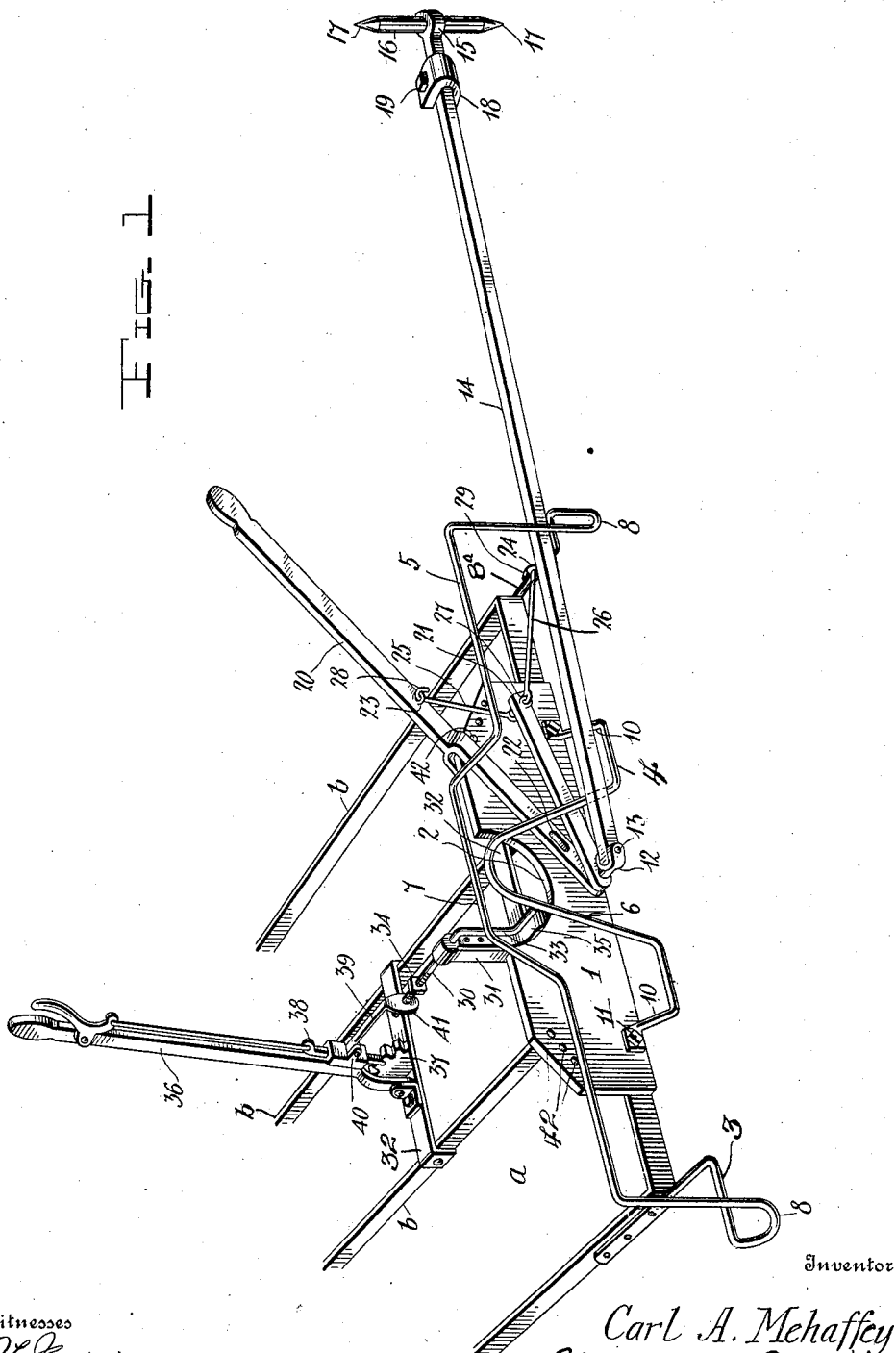
Witnesses
Inventor
Carl A. Mehaffey
By Victor J. Evans
Attorney

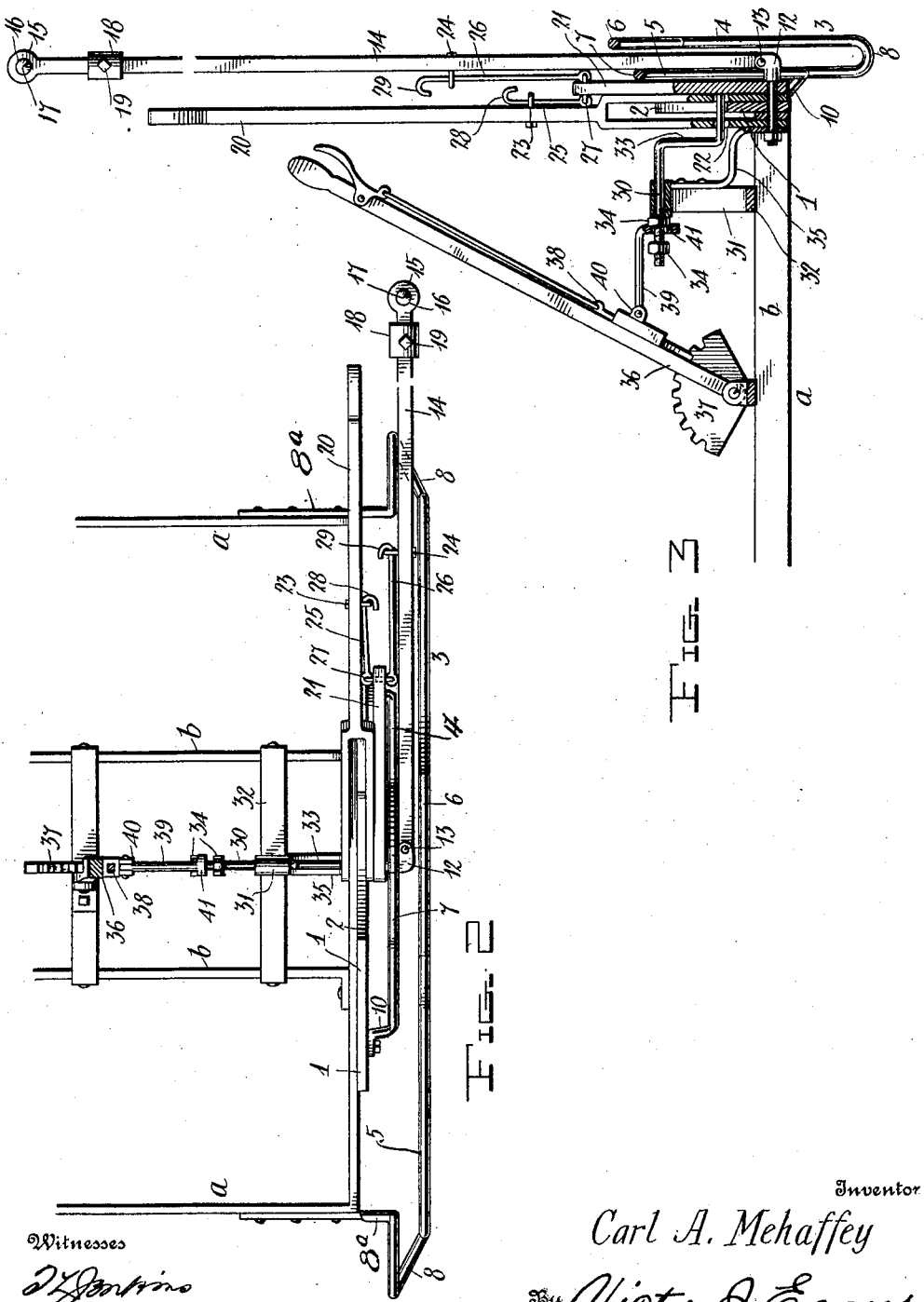

UNITED STATES PATENT OFFICE.

CARL A. MEHAFFEY, OF WEST LEBANON, INDIANA.

MARKER ATTACHMENT FOR CORN-PLANTERS.

No. 896,742.  Specification of Letters Patent.  Patented Aug. 25, 1908.

Application filed September 4, 1907. Serial No. 391,394.

*To all whom it may concern:*

Be it known that I, CARL A. MEHAFFEY, a citizen of the United States of America, residing at West Lebanon, in the county of Warren and State of Indiana, have invented new and useful Improvements in Marker Attachments for Corn-Planters, of which the following is a specification.

This invention is an improved marker attaching mechanism for corn and other planters to enable the same to be used for planting in check and drilled rows, and the said invention consists in the construction, combination and arrangement of devices hereinafter described and claimed.

The object of my invention is to provide an improved marker bar supporting and operating mechanism which may be readily attached to the frame of a corn or other seed planting machine, and by means of which the marker bar may be instantly thrown to either side of the machine or disposed in a vertical, inoperative position and locked in such inoperative position.

In the accompanying drawings,—Figure 1 is a perspective view of a marker bar and operating mechanism therefor embodying my improvements, showing the same attached to the rear portion of the framework of an ordinary corn planting machine. Fig. 2 is a top plan view of the same. Fig. 3 is a vertical sectional view of the same, with the marker bar in vertical, inoperative position and locked in such position.

In the embodiment of my invention I provide a supporting element 1, which is here shown as a vertically disposed plate bolted and extending transversely on the rear side of the planting machine frame $a$. The said supporting element may be made of wood, metal or other suitable material and may be of any desired form. In the upper side of the said supporting element, at the center thereof, is a semicircular clearance opening 2.

A guiding and supporting frame 3 is here shown as comprising a pair of transversely disposed bars 4—5, respectively provided at their centers with arches 6—7 and connected together at their ends by U-shaped bends 8. The said bars 4—5 are spaced apart, the former behind the latter, and form a guide-way between them as will be understood, especially upon reference to Figs. 2 and 3 of the drawings. The bar 4 is shown as provided with forwardly and upwardly extending supporting arms 10 which are bolted to the supporting element as at 11. The bar 5 is provided with arms $8^a$ which form extensions of the bends 8 and which bear against opposite sides of and are bolted or otherwise secured to the frame $b$ at the rear corners of such frame. Hence, the guiding and supporting frame is firmly held in position by the coaction of the arms $8^a$ and of the supporting element 11 to which the arms 10 are secured.

A pivot bolt 12, which is horizontally disposed and is also longitudinally disposed with reference to the frame $a$, extends through openings in the rear side of such frame and the supporting element 1. To the rear end of such pivot bolt is pivotally connected, as at 13, the inner end of a marker bar 14, which marker bar is provided at its outer end with an eye 15 for the reception of a marking pin 16, the ends of which extend in opposite directions and are pointed, as at 17. Also on the said marker bar is a weight 18 which may be of any suitable construction, is adapted to be adjusted on the said marker bar longitudinally of the latter, and is here shown as provided with a set screw 19 by means of which it may be secured to the marker bar at any desired adjustment. The bolt 12 also forms the pivot for the marker-bar-operating or throwing lever 20 and a link lever 21, the latter being disposed in rear of the former and the said lever 20 being shown as having its inner end bifurcated or disposed astride of the rear cross bar of the frame $a$ and also of the supporting element 1, and as provided in its forks with openings 22 which are within the radius of the opening 2. The said lever 20 and the marker bar 14 are respectively provided with guiding and stop elements, here shown as eye bolts 23, 24, which are pivotally mounted therein, the eyes of the said eye bolts being disposed on the opposing sides of said lever and said marker bar. Link rods 25, 26 are pivotally connected, as at 27, to the link lever 21 near the outer end of such lever, and respectively pass through and are adapted to slide longitudinally in the eyes of the eye bolts 23, 24, so that they are slidably connected respectively to the lever 20 and marker bar 14 and have their outer ends respectively provided with hooks or stops 28, 29.

A longitudinally movable crank rod 30 is mounted in a bearing in the upper end of a standard 31, which standard has a supporting bar 32 at its base which bears on and is secured to the inner longitudinally disposed bars b of the frame a. The crank portion 33 of said crank rod is adapted to be moved into and out of the clearance opening 2 of the supporting element 1, and the front end portion of said crank rod is here shown as screw-threaded and provided with adjustable stop nuts 34. A brace 35 is here shown secured to the standard 31 and engaged by the pivot bolt 12. The usual lever 36 for starting and stopping the planting mechanism is here shown as mounted on the frame a, a segment 37 and dog 38 being provided to secure such lever at any desired adjusted position. A link rod 39 has its front end pivotally connected to said lever, as at 40, and its rear end downturned, as at 41, and is provided with an opening through which the rod 30 extends, said downturned portion 41 of said link rod being disposed and adapted to travel between the nuts 34. By means of the said lever 36 the rod 30 may be moved longitudinally to cause it to engage or disengage the openings 22 of the marker bar throwing lever 20 to lock such lever in a vertical position, as shown in Fig. 3, or release such lever so that it may be inclined in either direction, as shown in Figs. 1 and 2. Stops 42 are shown on the rear side of the supporting element 1, between which stops the said lever 20 operates, such stops serving to determine the extent to which such lever may move in either direction.

The operation of the invention is as follows: Assuming that the marker bar is in an elevated position slightly inclined toward either side of the frame, and the lever 20 is in a similar position to support such marker bar in such initial, elevated position, by reason of the connections 25, 21 and 26 between them, and that the lever 36 is rearwardly inclined with its crank rod 30 engaged with the opening 22 of such lever 20, the latter, and hence also the marker bar will be supported in such elevated initial position. At the beginning of a row the lever 36 is turned forwardly to lower the corn planting mechanism into operation, and such forward motion of such lever causes the latter to draw the rod 30 endwise forwardly and disengage said rod from the opening 22 of the lever 20 and thereby release such lever so that it drops to the nearest stop 42 and in so doing permits the marker bar and the link lever 21 to also drop. The motion of the lever 20 is arrested by the stop 42 before the marker bar reaches the ground, so that the link rod 25, which is slidably connected to such lever 20, checks the descent of the link lever 21, and the latter through the instrumentality of the link rod 26 which is slidably connected to the marker bar tightens as said marker bar reaches the ground. It will be observed that the lever 36, which operates to start the planting mechanism, also simultaneously releases the marker and the lever 20, and hence the machine is adapted for use in check-row planting. In order to raise the marker bar this may be readily done by appropriately moving the lever 20. If it be desired to throw the marker bar to the opposite side of the machine this may be accomplished by imparting a quick movement through the lever 20, which movement of such lever is communicated first to the link lever 21, through the link rod 25 and finally to the marker bar through the link rod 26, as will be understood. The angular movement of the crank rod 30 adapts the same to hold the lever 20 and hence also the marker bar 14 in their initial elevated position inclined in either direction.

My improved marking mechanism may be attached to a planting machine of any ordinary construction and requires no alteration in the structure of such machine or of the frame thereof.

Having thus described the invention, what is claimed as new, is:—

1. The combination of a pivotally mounted marker, a marker-operating lever, a link lever disposed between said marker and said marker-operating lever, and connections between said link lever, said operating lever and said marker, for the purpose set forth.

2. The combination of a pivotally mounted marker, a marker-operating lever, a link lever disposed between said marker and said operating lever, and connections between said link lever, said operating lever and said marker, the said connections permitting lost motion between the link lever and the operating lever and also permitting lost motion between the link lever and the marker.

3. The combination of a pivotally mounted marker, a marker-operating lever, a link lever having its pivot coincident with that of the operating lever, and connections between said link lever, said operating lever, and said marker, for the purpose set forth.

4. In a machine of the class described, the combination of a pivotally mounted marker, a link lever, a marker-operating lever, and connections between said link lever, said operating lever and said marker, said connections permitting lost motion between the link lever and the operating lever and lost motion between the link lever and the marker, with a pivotally mounted means to engage and limit the movement of said operating lever, and means to move said pivotally mounted means into and out of engagement with said operating lever.

5. In combination with a machine of the class described having a controlling lever, a pivotally mounted marker, an operating lever for said marker, connections between said operating lever and said marker and means actuated by said controlling lever to engage and disengage said marker operating lever to lock the latter in initial position and release the same from such position.

6. In a machine of the class described, the combination of a pivotally mounted marker, a pivotally mounted link lever, a marker operating lever, connections between said link lever, said operating lever and said marker to cause said operating lever, link lever and marker to move simultaneously and to also permit lost motion between said operating lever and said link lever and between said link lever and said marker, and means to engage said operating lever when the latter is in an upright position to cause said operating lever to lock the link lever and the marker in elevated position.

7. A marker attachment for corn planters comprising a guiding and supporting frame for attachment to the rear end of the frame of a corn planter and to extend transversely with reference to such corn planter, such frame comprising a pair of transversely disposed bars respectively provided at their centers with arches and connected together by bends, said bars being spaced apart, one behind the other, and forming a guide-way between them, a plate on the front side of said guiding and supporting frame disposed transversely with reference to the frame of the corn planter and also extending vertically; a marker operating lever pivotally connected to said plate, a link lever disposed between said guiding and supporting frame and said plate, a marker pivotally connected to said said plate and disposed between the bars of the said guiding and supporting frame, said frame maintaining said marker bar in place and permitting the same to be raised and lowered and connections between said link lever, said operating lever and said marker bar, substantially as described.

In testimony whereof I affix my signature in presence of two witnesses.

CARL A. MEHAFFEY.

Witnesses:
   GEO. L. PENCE,
   GEORGE CHAPMAN.